(12) United States Patent
Nobukuni

(10) Patent No.: US 12,344,045 B2
(45) Date of Patent: Jul. 1, 2025

(54) TIRE

(71) Applicant: Sumitomo Rubber Industries, Ltd., Hyogo (JP)

(72) Inventor: Shingo Nobukuni, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 183 days.

(21) Appl. No.: 18/156,121

(22) Filed: Jan. 18, 2023

(65) Prior Publication Data

US 2023/0256779 A1   Aug. 17, 2023

(30) Foreign Application Priority Data

Feb. 17, 2022   (JP) ................................. 2022-022736

(51) Int. Cl.
   *B60C 15/06*   (2006.01)
(52) U.S. Cl.
   CPC .... *B60C 15/0607* (2013.01); *B60C 2015/061* (2013.01)
(58) Field of Classification Search
   CPC . B60C 15/0607; B60C 15/0603; B60C 15/06; B60C 2015/061; B60C 2015/0617; B60C 2015/0621; B60C 2015/0625
   See application file for complete search history.

(56) References Cited

U.S. PATENT DOCUMENTS

2017/0057301 A1 *   3/2017   Hashimoto ......... B60C 17/0009

FOREIGN PATENT DOCUMENTS

| JP | H11301218 A | * | 11/1991 | |
| JP | 05124408 A | * | 5/1993 | ......... B60C 15/0018 |
| JP | 2003291613 A | * | 10/2003 | ......... B60C 15/0607 |
| JP | 2006096178 A | * | 4/2006 | |
| JP | 2008105515 A | * | 5/2008 | |
| JP | 2015174515 A | * | 10/2015 | |

* cited by examiner

*Primary Examiner* — Cedrick S Williams
*Assistant Examiner* — Thomas Frank Schneider
(74) *Attorney, Agent, or Firm* — Studebaker Brackett PLLC

(57) ABSTRACT

Provided is a tire 2 that can achieve reduction of rolling resistance while reducing a decrease in durability to be small. An apex 32 of each bead 10 includes an apex body 48, a strip apex 50, and an intermediate apex 52. An inner end of the strip apex 50 is located between a ply body 38a of a carcass ply 38 and the apex body 48. An inner end of the intermediate apex 52 is located between the strip apex 50 and the apex body 48. An outer end of the apex body 48 is located between the inner and outer ends of the intermediate apex 52. The intermediate apex 52 is located between the inner and outer ends of the strip apex 50. The intermediate apex 52 is harder than the apex body 48, and the strip apex 50 is harder than the intermediate apex 52.

19 Claims, 3 Drawing Sheets

TIRE

BACKGROUND OF THE INVENTION

Field of the Invention

The present invention relates to a tire.

Background Art

From consideration for the environment, reduction of rolling resistance is required for tires that are mounted to vehicles. For reducing rolling resistance, for example, thin sidewalls are used. In this case, the stiffness of each side portion is decreased. It is known that, in order to maintain good steering stability, the apex of each bead is composed of a hard strip apex and an apex body that is a conventional bead apex, and the strip apex is provided between the ply body of a carcass ply and the apex body, whereby a tire can maintain good steering stability (for example, Japanese Laid-Open Patent Publication No. 2015-174515).

In the tire in which the above-described strip apex is used, an inner end portion of the strip apex is interposed between the ply body and the apex body. The apex body is tapered outward. Around the outer end of the apex body, the stiffness difference between the apex body and the strip apex is large. In the tire, strain is concentrated around the outer end of the apex body. This stiffness difference may lead to a decrease in durability.

The present invention has been made in view of such circumstances. An object of the present invention is to provide a tire that can achieve reduction of rolling resistance while reducing a decrease in durability to be small.

SUMMARY OF THE INVENTION

A tire according to an aspect of the present invention includes a pair of beads and a carcass extending on and between a first bead and a second bead out of the pair of beads. Each of the beads includes a core and an apex. The carcass includes a carcass ply. The carcass ply includes a ply body extending between the core of the first bead and the core of the second bead, and a pair of turned-up portions each connected to the ply body and turned up around the core from an inner side toward an outer side in an axial direction. The apex includes an apex body located radially outward of the core, a strip apex located axially outward of the ply body, and an intermediate apex located axially outward of the strip apex. The apex body is tapered outward. An inner end of the strip apex is located between the ply body and the apex body. An inner end of the intermediate apex is located between the strip apex and the apex body. An outer end of the apex body is located between the inner end and an outer end of the intermediate apex in a radial direction. The intermediate apex is located between the inner end and an outer end of the strip apex in the radial direction. The intermediate apex is harder than the apex body, and the strip apex is harder than the intermediate apex.

Preferably, in the tire, a length of the intermediate apex is not less than 15 mm and not greater than 25 mm.

Preferably, in the tire, a length from the inner end of the intermediate apex to the outer end of the apex body is not less than 5 mm and not greater than 15 mm.

Preferably, in the tire, a difference (Hm−Ha) between a hardness Hm of the intermediate apex and a hardness Ha of the apex body is not greater than 5.

Preferably, in the tire, a difference (Hs−Hm) between a hardness Hs of the strip apex and the hardness Hm of the intermediate apex is not greater than 5.

Preferably, in the tire, the hardness Ha of the apex body is not less than 60 and not greater than 80.

Preferably, in the tire, a length of the apex body is not less than 15 mm and not greater than 45 mm.

Preferably, in the tire, a ratio of a maximum width of the apex body to the length of the apex body is not less than 0.2 and not greater than 0.7.

Preferably, in the tire, a position, in the ply body, away from a position, in the ply body, corresponding to the outer end of the apex body, toward the inner end side of the strip apex by 15 mm is a first reference position, and a position, in the ply body, away from a position, in the ply body, corresponding to the outer end of the intermediate apex, toward the outer end side of the strip apex by 10 mm is a second reference position. A stiffness of the apex at each position in the ply body is represented by a stiffness index R indicated by the following equation (1) using the hardness Ha of the apex body, the hardness Hs of the strip apex, the hardness Hm of the intermediate apex, and a thickness to of the apex body, a thickness ts of the strip apex, and a thickness tm of the intermediate apex which are measured along a normal line normal to the ply body.

$$R = Ha \times ta + Hs \times ts + Hm \times tm \qquad (1)$$

When the stiffness index R of the apex at the first reference position is defined as a reference stiffness index Rb, a ratio of the stiffness index R of the apex to the reference stiffness index Rb at an arbitrary position in a zone from the first reference position to the second reference position is not less than 100% and not greater than 110%.

According to the present invention, a tire that can achieve reduction of rolling resistance while reducing a decrease in durability to be small, is obtained.

DETAILED DESCRIPTION

Hereinafter, the present invention will be described in detail based on preferred embodiments with appropriate reference to the drawings.

A tire is fitted on a rim. The interior of the tire is filled with air to adjust the internal pressure of the tire. In the present disclosure, the tire fitted on the rim is a tire-rim assembly. The tire-rim assembly includes the rim and the tire fitted on the rim.

In the present disclosure, a state where the tire is fitted on a normal rim, the internal pressure of the tire is adjusted to a normal internal pressure, and no load is applied to the tire is referred to as a normal state.

In the present disclosure, unless otherwise specified, the dimensions and angles of each component of the tire are measured in the normal state.

The dimensions and angles of each component in a meridian cross-section of the tire, which cannot be measured in a state where the tire is fitted on the normal rim, are measured in a cross-section (hereinafter, referred to as a reference cut plane) of the tire obtained by cutting the tire along a plane including a rotation axis, with the distance between right and left beads being made equal to the distance between the beads in the tire that is fitted on the normal rim.

The normal rim means a rim specified in a standard on which the tire is based. The "standard rim" in the JATMA standard, the "Design Rim" in the TRA standard, and the "Measuring Rim" in the ETRTO standard are normal rims.

The normal internal pressure means an internal pressure specified in the standard on which the tire is based. The "highest air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are normal internal pressures.

The normal load means a load specified in the standard on which the tire is based. The "maximum load capacity" in the JATMA standard, the "maximum value" recited in the "TIRE LOAD LIMITS AT VARIOUS COLD INFLATION PRESSURES" in the TRA standard, and the "LOAD CAPACITY" in the ETRTO standard are normal loads.

In the present disclosure, of the elements forming the tire, the hardness of each element formed from a crosslinked rubber is measured according to the standards of JIS K6253 under a temperature condition of 23° C. using a type A durometer.

In the present disclosure, a tread portion of the tire is a portion of the tire that comes into contact with a road surface. A bead portion is a portion of the tire that is fitted to a rim. A side portion is a portion of the tire that extends between the tread portion and the bead portion. The tire includes a tread portion, a pair of bead portions, and a pair of side portions as portions thereof.

Figure 1:
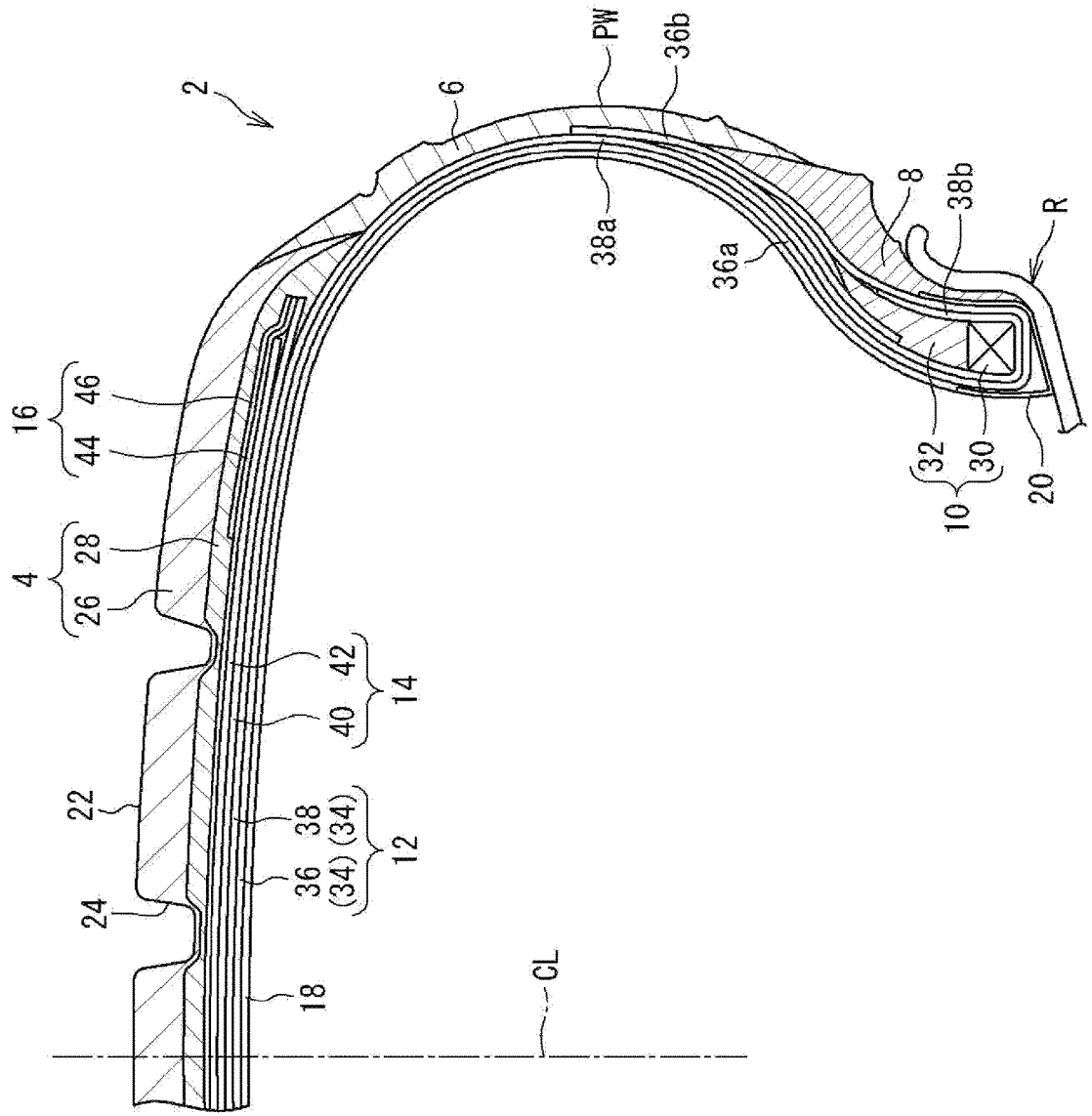
FIG. 1 is a cross-sectional view showing a part of a tire according to an embodiment of the present invention.

FIG. 1 shows a part of a tire 2 according to an embodiment of the present invention. The tire 2 is suitable for use for passenger cars, van-type small-sized commercial vehicles, small-sized trucks, etc. The tire 2 shown in FIG. 1 is a pneumatic tire for a passenger car that can be adapted to a pickup truck. The tire 2 of the present disclosure is not limited to this type of use.

The tire 2 is fitted on a rim R. The rim R is a normal rim. The interior of the tire 2 is filled with air to adjust the internal pressure of the tire 2.

FIG. 1 shows a part of a cross-section (hereinafter, referred to as a meridian cross-section) of the tire 2 taken along a plane including the rotation axis of the tire 2. In FIG. 1, the right-left direction is the axial direction of the tire 2, and the up-down direction is the radial direction of the tire 2. The direction perpendicular to the surface of the drawing sheet of FIG. 1 is the circumferential direction of the tire 2. An alternate long and short dash line CL represents the equator plane of the tire 2.

In FIG. 1, a position indicated by reference character PW is an axially outer end of the tire 2. In the case where decorations such as patterns and letters are present on the outer surface of the tire 2, the axially outer end PW (hereinafter, referred to as outer end PW) is specified in the tire 2 in the normal state on the basis of a virtual outer surface obtained on the assumption that the decorations are not present. The distance in the axial direction from a first outer end PW to a second outer end PW is the cross-sectional width (see JATMA or the like) of the tire 2. The cross-sectional width is the maximum width of the tire 2, and each outer end PW is a position (hereinafter, referred to as a maximum width position) at which the tire 2 has the maximum width.

The tire 2 includes a tread 4, a pair of sidewalls 6, a pair of clinches 8, a pair of beads 10, a carcass 12, a belt 14, a band 16, an inner liner 18, and a pair of chafers 20.

The tread 4 comes into contact with a road surface at a tread surface 22 thereof. The tread 4 has the tread surface 22 which comes into contact with a road surface. Grooves 24 are formed on the tread 4. Accordingly, a tread pattern is formed.

The tread 4 includes a cap portion 26 and a base portion 28.

The cap portion 26 includes the tread surface 22. The cap portion 26 is formed from a crosslinked rubber for which wear resistance and grip performance are taken into consideration.

The base portion 28 is located radially inward of the cap portion 26. The base portion 28 is covered with the cap portion 26. The base portion 28 covers the belt 14 and the band 16. The base portion 28 is formed from a crosslinked rubber that has low-heat generation properties.

Each sidewall 6 is connected to an end of the tread 4. The sidewall 6 is located radially inward of the tread 4. The sidewall 6 is formed from a crosslinked rubber for which cut resistance is taken into consideration.

From the viewpoint of reduction of rolling resistance, the thickness of the sidewall 6 at the maximum width position PW is preferably not greater than 5.0 mm. From the viewpoint of ensuring the stiffness of each side portion, this thickness is preferably not less than 3.0 mm.

Each clinch 8 is located radially inward of the sidewall 6. The clinch 8 comes into contact with a flange of the rim R. The clinch 8 is formed from a crosslinked rubber for which wear resistance is taken into consideration.

Each bead 10 is located axially inward of the clinch 8. The bead 10 is located radially inward of the sidewall 6.

The bead 10 includes a core 30 and an apex 32. The core 30 extends in the circumferential direction. The core 30 includes a steel wire which is not shown. The apex 32 is located radially outward of the core 30. The apex 32 is formed from a crosslinked rubber.

The carcass 12 is located inward of the tread 4, the pair of sidewalls 6, and the pair of clinches 8. The carcass 12 extends on and between a first bead 10 and a second bead 10 out of the pair of beads 10. The carcass 12 includes at least one carcass ply 34.

The carcass 12 of the tire 2 is composed of two carcass plies 34. Each carcass ply 34 includes a large number of carcass cords aligned with each other, which are not shown. These carcass cords intersect the equator plane CL. The carcass 12 of the tire 2 has a radial structure. In the tire 2, a cord formed from an organic fiber is used as each carcass cord. Examples of the organic fiber include nylon fibers, rayon fibers, polyester fibers, and aramid fibers.

Out of the two carcass plies 34, the carcass ply 34 located radially inward on the inner side of the tread 4 is a first carcass ply 36. The carcass ply 34 located radially outward of the first carcass ply 36 on the inner side of the tread 4 is a second carcass ply 38.

The first carcass ply 36 includes a first ply body 36a and a pair of first turned-up portions 36b. The first ply body 36a extends between the core 30 of the first bead 10 and the core 30 of the second bead 10. Each first turned-up portion 36b is connected to the first ply body 36a and turned up around the core 30 from the inner side toward the outer side in the axial direction.

The second carcass ply 38 includes a second ply body 38a and a pair of second turned-up portions 38b. The second ply body 38a extends between a first core 30 and a second core 30. Each second turned-up portion 38b is connected to the second ply body 38a and turned up around the core 30 from the inner side toward the outer side in the axial direction.

In the tire 2, an end of each first turned-up portion 36b is located radially outward of the axially outer end PW. An end of each second turned-up portion 38b is located radially inward of the outer end PW. The end of each second turned-up portion 38b is located between an outer end of an apex body described later and the core 30 in the radial direction. Each second turned-up portion 38b is located axially inward of the first turned-up portion 36b.

The belt 14 is located radially inward of the tread 4. The belt 14 is stacked on the carcass 12. The belt 14 includes an inner layer 40 and an outer layer 42.

The inner layer 40 is located radially outward of the second ply body 38a, and stacked on the second ply body 38a. The outer layer 42 is located radially outward of the inner layer 40, and stacked on the inner layer 40.

Each of the inner layer 40 and the outer layer 42 includes a large number of belt cords aligned with each other, which are not shown. These belt cords are covered with a topping rubber. Each belt cord is inclined relative to the equator plane CL. The direction in which the belt cords included in the inner layer 40 are inclined is opposite to the direction in which the belt cords included in the outer layer 42 are inclined. The material of each belt cord is steel.

The band 16 is located between the tread 4 and the belt 14 in the radial direction. The band 16 is stacked on the belt 14.

The band 16 includes a helically wound band cord which is not shown. The band cord is covered with a topping rubber. The band cord extends substantially in the circumferential direction. Specifically, an angle of the band cord with respect to the circumferential direction is not greater than 5°. The band 16 has a jointless structure. A cord formed from an organic fiber is used as the band cord. Examples of the organic fiber include nylon fibers, rayon fibers, polyester fibers, and aramid fibers.

The band 16 of the tire 2 includes a full band 44 and a pair of edge bands 46.

The full band 44 has ends opposed to each other across the equator plane CL.

The full band 44 is stacked on the belt 14.

The pair of edge bands 46 are disposed so as to be spaced apart from each other in the axial direction with the equator plane CL therebetween. Each edge band 46 is stacked on the full band 44. The edge band 46 covers an end portion of the full band 44.

The band 16 may be composed of only the full band 44, or may be composed of only the pair of edge bands 46.

The inner liner 18 is located inward of the carcass 12. The inner liner 18 forms an inner surface of the tire 2. The inner liner 18 is formed from a crosslinked rubber that has an excellent air blocking property. The inner liner 18 maintains the internal pressure of the tire 2.

Each chafer 20 is located radially inward of the bead 10. The chafer 20 includes a fabric and a rubber with which the fabric is impregnated. The chafer 20 comes into contact with a seat of the rim R.

Figure 2:
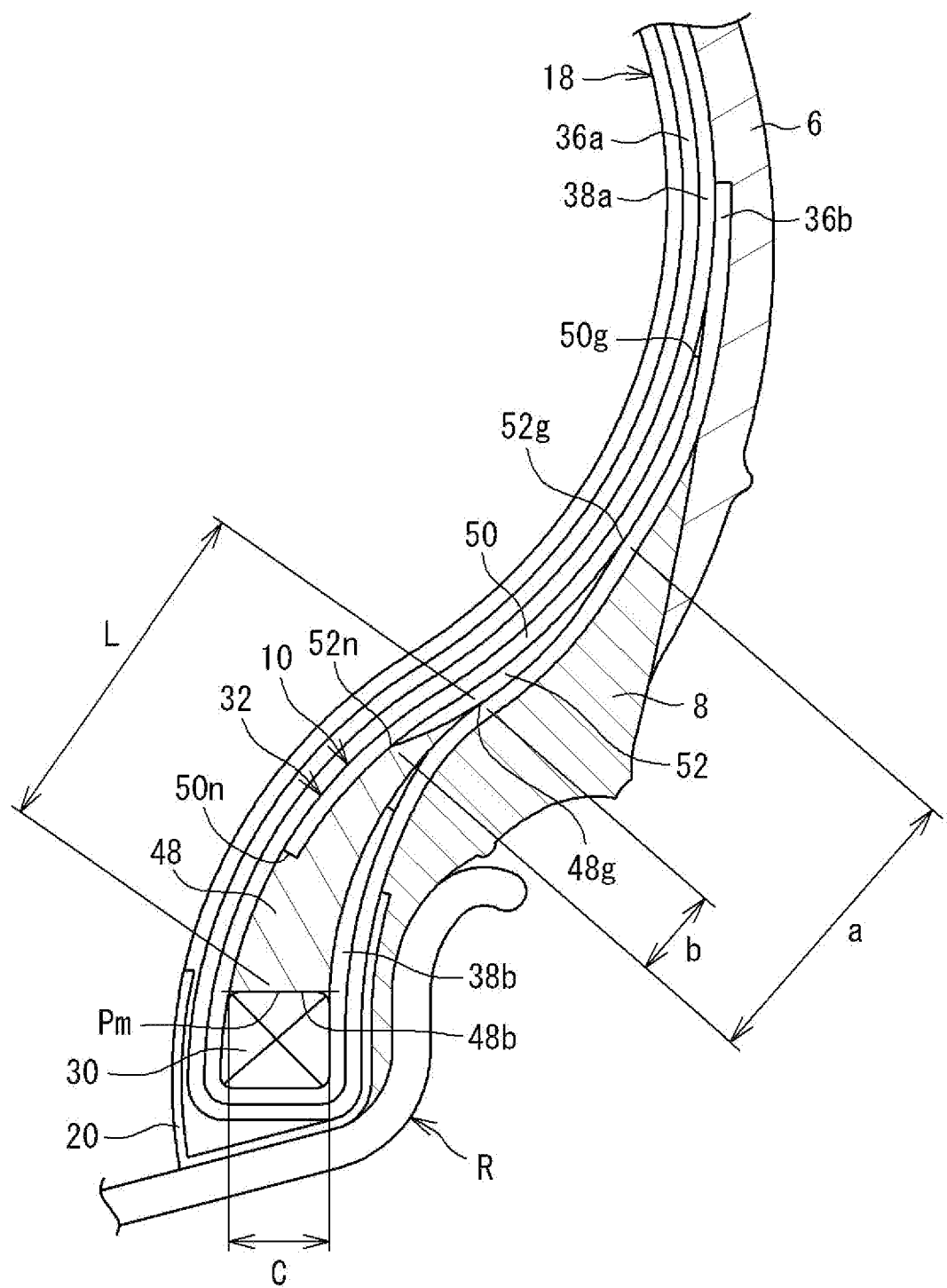
FIG. 2 is a cross-sectional view showing a bead portion of the tire.

FIG. 2 shows a part of the tire 2 shown in FIG. 1. FIG. 2 shows a bead portion of the tire 2.

As described above, each bead 10 of the tire 2 includes the core 30 and the apex 32. The apex 32 of the tire 2 includes an apex body 48, a strip apex 50, and an intermediate apex 52.

The apex body 48 is located radially outward of the core 30. The apex body 48 is stacked on the core 30. The apex body 48 is in contact with the core 30 at a bottom surface 48b thereof. In the meridian cross-section of the tire 2, the apex body 48 is tapered outward. The apex body 48 is formed from a crosslinked rubber. A hardness Ha of the apex body 48 is preferably not less than 60 and not greater than 80.

In FIG. 2, a position indicated by reference character Pm is the center of the bottom surface 48b of the apex body 48. The center Pm is represented as the center position of the bottom surface 48b in the axial direction.

A length indicated by reference character L is the length of a line segment connecting the center Pm and an outer end 48g of the apex body 48. In the present disclosure, the length L is the length of the apex body 48. The length L is obtained in the meridian cross-section of the tire 2. In the case where the bottom surface 48b has a shape that projects outward, the length L of the apex body 48 is represented as the length of a line segment connecting the radially outer end (in other words, top) of the bottom surface 48b and the outer end 48g of the apex body 48.

In the tire 2, from the viewpoint of improvement of durability, the length L of the apex body 48 is preferably not less than 15 mm. From the viewpoint of reducing the adverse effect on mass and rolling resistance, the length L is preferably not greater than 45 mm, more preferably not greater than 40 mm, and further preferably not greater than 35 mm.

In FIG. 2, a length indicated by reference character C is the maximum width of the apex body 48. As described above, the apex body 48 of the tire 2 is tapered outward. The width in the axial direction of the apex body 48 indicates the maximum width C at the center Pm. The maximum width C is represented as the length of a line of intersection of the apex body 48 and a straight line that passes through the center Pm and extends in the axial direction.

In the tire 2, from the viewpoint of improvement of durability, the ratio (C/L) of the maximum width C of the apex body 48 to the length L of the apex body 48 is preferably not less than 0.2. From the viewpoint of being able to stably produce the tire 2, the ratio (C/L) is preferably not greater than 0.7.

The strip apex 50 is located axially outward of the second ply body 38a. The strip apex 50 is composed of a sheet-shaped member. The entirety of the strip apex 50 is stacked on the second ply body 38a.

An inner end 50n of the strip apex 50 is interposed between the second ply body 38a and the apex body 48. The inner end 50n of the strip apex 50 is located radially inward of the outer end 48g of the apex body 48. The outer end 48g of the apex body 48 is located between the inner end 50n and an outer end 50g of the strip apex 50 in the radial direction.

The outer end 50g of the strip apex 50 is located radially inward of the end of the first turned-up portion 36b. The outer end 50g of the strip apex 50 is located between the second ply body 38a and the first turned-up portion 36b. The outer end 50g of the strip apex 50 is interposed between the second ply body 38a and the first turned-up portion 36b.

The strip apex 50 is formed from a crosslinked rubber. A hardness Hs of the strip apex 50 is preferably not less than 80 and not greater than 100.

The intermediate apex 52 is located axially outward of the strip apex 50. The intermediate apex 52 is composed of a sheet-shaped member. The entirety of the intermediate apex 52 is stacked on the strip apex 50.

An inner end 52n of the intermediate apex 52 is located radially outward of the inner end 50n of the strip apex 50. The inner end 52n of the intermediate apex 52 is located radially inward of the outer end 48g of the apex body 48.

The inner end 52n of the intermediate apex 52 is interposed between the strip apex 50 and the apex body 48.

An outer end 52g of the intermediate apex 52 is located radially inward of the outer end 50g of the strip apex 50. The outer end 52g of the intermediate apex 52 is located radially outward of the outer end 48g of the apex body 48. The outer end 52g of the intermediate apex 52 is located between the strip apex 50 and the first turned-up portion 36b. The outer end 52g of the intermediate apex 52 is interposed between the strip apex 50 and the first turned-up portion 36b.

The intermediate apex 52 is formed from a crosslinked rubber. A hardness Hm of the intermediate apex 52 is preferably not less than 70 and not greater than 90.

In the tire 2, the inner end 50n of the strip apex 50 is located between the second ply body 38a and the apex body 48.

The inner end 52n of the intermediate apex 52 is located between the strip apex 50 and the apex body 48.

The outer end 48g of the apex body 48 is located between the inner end 52n and the outer end 52g of the intermediate apex 52 in the radial direction. The intermediate apex 52 is located between the inner end 50n and the outer end 50g of the strip apex 50 in the radial direction.

In the tire 2, the intermediate apex 52 whose entirety is stacked on the strip apex 50 is located between the outer end 48g of the apex body 48 and the strip apex 50. Furthermore, the intermediate apex 52 is harder than the apex body 48, and the strip apex 50 is harder than the intermediate apex 52. In other words, the intermediate apex 52 is harder than the apex body 48, and softer than the strip apex 50.

As described above, the apex body 48 is tapered outward. A portion at the outer end 48g of the apex body 48 has a stiffness lower than that of the other portion thereof. The stiffness difference between the portion at the outer end 48g of the apex body 48 and the strip apex 50 is considerably large.

In the tire 2, the intermediate apex 52 which is softer than the strip apex 50 and harder than the apex body 48 is located between the outer end 48g of the apex body 48 and the strip apex 50. The intermediate apex 52 alleviates the stiffness difference produced between the strip apex 50 and the apex body 48. In the tire 2, concentration of strain around the outer end 48g of the apex body 48 is suppressed. The tire 2 has higher durability than a conventional tire in which no intermediate apex 52 is provided between the strip apex 50 and the apex body 48. The tire 2 has improved durability even though the strip apex 50 is used in order to reduce rolling resistance and improve steering stability.

The tire 2 can have required durability while maintaining good steering stability even when thin sidewalls are used for rolling resistance.

The tire 2 can achieve reduction of rolling resistance while reducing a decrease in durability to be small.

In FIG. 2, a length indicated by reference character a is the length of the intermediate apex 52. The length a is obtained by measuring the length from the inner end 52n to the outer end 52g of the intermediate apex 52 along the interface between the intermediate apex 52 and the strip apex 50 in the meridian cross-section of the tire 2. A length indicated by reference character b is the length from the inner end 52n of the intermediate apex 52 to the outer end 48g of the apex body 48. The length b is also the overlap length between the intermediate apex 52 and the apex body 48. The overlap length b is obtained by measuring the length from the inner end 52n of the intermediate apex 52 to the outer end 48g of the apex body 48 along the interface between the intermediate apex 52 and the apex body 48 in the meridian cross-section of the tire 2.

In the tire 2, the length a of the intermediate apex 52 is preferably not less than 15 mm and not greater than 25 mm.

When the length a is set so as to be not less than 15 mm, the intermediate apex 52 can effectively contribute to alleviation of the stiffness difference produced between the strip apex 50 and the apex body 48. The tire 2 can achieve improvement of durability. From this viewpoint, the length a is more preferably not less than 17 mm.

When the length a is set so as to be not greater than 25 mm, the influence of the intermediate apex 52 on rolling resistance is reduced, and low rolling resistance is maintained. From this viewpoint, the length a is more preferably not greater than 23 mm.

In the tire 2, the length b from the inner end 52n of the intermediate apex 52 to the outer end 48g of the apex body 48 is preferably not less than 5 mm and not greater than 15 mm.

When the length b is set so as to be not less than 5 mm, the intermediate apex 52 can effectively contribute to alleviation of the stiffness difference produced between the strip apex 50 and the apex body 48. The tire 2 can achieve improvement of durability. From this viewpoint, the length b is more preferably not less than 7 mm.

When the length b is set so as to be not greater than 15 mm, the influence of the intermediate apex 52 on rolling resistance is reduced, and low rolling resistance is maintained. From this viewpoint, the length b is more preferably not greater than 13 mm.

As described above, in the tire 2, the intermediate apex 52 is harder than the apex body 48. If the intermediate apex 52 is excessively harder than the apex body 48, a large stiffness difference is produced between the intermediate apex 52 and the apex body 48, so that there is a concern that the durability is decreased. From the viewpoint of maintaining good durability, the difference (Hm−Ha) between the hardness Hm of the intermediate apex 52 and the hardness Ha of the apex body 48 is preferably not greater than 5. From the viewpoint that the intermediate apex 52 can effectively contribute to alleviation of the stiffness difference produced between the strip apex 50 and the apex body 48, the difference (Hm−Ha) is preferably not less than 2 and more preferably not less than 3.

As described above, in the tire 2, the strip apex 50 is harder than the intermediate apex 52. In other words, the intermediate apex 52 is softer than the strip apex 50. If the intermediate apex 52 is excessively softer than the strip apex 50, a large stiffness difference is produced between the strip apex 50 and the intermediate apex 52, so that there is a concern that the durability is decreased. From the viewpoint of maintaining good durability, the difference (Hs−Hm) between the hardness Hs of the strip apex 50 and the hardness Hm of the intermediate apex 52 is preferably not greater than 5. From the viewpoint that the intermediate apex 52 can effectively contribute to alleviation of the stiffness difference produced between the strip apex 50 and the apex body 48, the difference (Hs−Hm) is preferably not less than 2 and more preferably not less than 3.

In the tire 2, from the viewpoint of obtaining good durability, more preferably, the difference (Hm−Ha) between the hardness Hm of the intermediate apex 52 and the hardness Ha of the apex body 48 is not greater than 5, and the difference (Hs−Hm) between the hardness Hs of the strip apex 50 and the hardness Hm of the intermediate apex 52 is not greater than 5.

In the tire 2, preferably, the stiffness of the apex 32 around the outer end 48g of the apex body 48 is controlled using a stiffness index represented by the product of the hardness and the thickness of each component included in the apex 32 (i.e., the apex body 48, the strip apex 50, and the intermediate apex 52).

Figure 3:
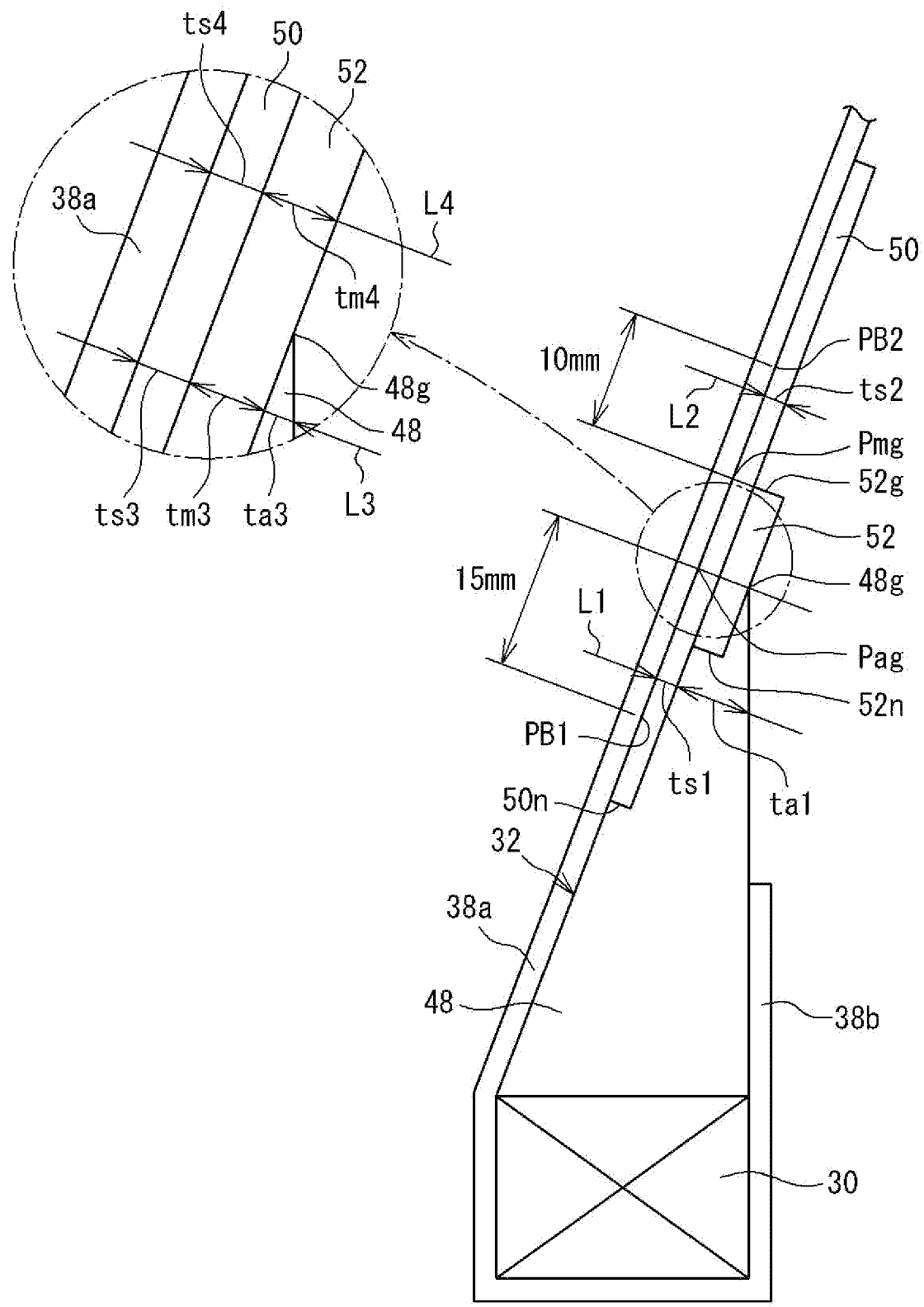
FIG. 3 is a cross-sectional view illustrating control of the stiffness of an apex.

FIG. 3 is a cross-sectional view illustrating control of the stiffness of the apex 32. FIG. 3 shows a cross-section of the apex 32 as a conceptual diagram in order to describe the stiffness index used for controlling the stiffness of the apex 32.

In the tire 2, the stiffness of the apex 32 at each position in the second ply body 38a on which the entirety of the strip apex 50 is stacked is represented by a stiffness index. When the stiffness index is denoted by R, the stiffness index R is indicated by the following equation (1) using the hardness Ha of the apex body 48, the hardness Hs of the strip apex 50, the hardness Hm of the intermediate apex 52, and a thickness to of the apex body 48, a thickness is of the strip apex 50, and a thickness tm of the intermediate apex 52 which are measured along a normal line that is normal to the second ply body 38a.

$$R = Ha \times ta + Hs \times ts + Hm \times tm \quad (1)$$

Next, a method for calculating the stiffness index R using the equation (1) will be described.).

In FIG. 3, a position indicated by reference character Pag is the point of intersection of the outer surface of the second ply body 38a and a normal line that passes through the outer end 48g of the apex body 48 and is normal to the outer surface of the second ply body 38a. The position Pag is a position, in the second ply body 38a, corresponding to the outer end 48g of the apex body 48. The position Pag is also referred to as outer end corresponding position of the apex body 48.

A position indicated by reference character PB1 is a position on the outer surface of the second ply body 38a. The position PB1 is the position away from the outer end corresponding position Pag of the apex body 48 toward the inner end 50n side of the strip apex 50 by 15 mm. In the present disclosure, the position PB1 is a first reference position. The length from the outer end corresponding position Pag to the first reference position PB1 is measured along the interface between the second ply body 38a and the strip apex 50.

FIG. 3 shows the case where the first reference position PB1 is located radially inward of the inner end 52n of the intermediate apex 52, as an example. However, the first reference position PB1 may coincide with the position of the inner end 52n of the intermediate apex 52, or may be located radially outward of the inner end 52n of the intermediate apex 52.

In FIG. 3, a position indicated by reference character Pmg is the point of intersection of the outer surface of the second ply body 38a and a normal line that passes through the outer end 52g of the intermediate apex 52 and is normal to the outer surface of the second ply body 38a. The position Pmg is a position, in the second ply body 38a, corresponding to the outer end 52g of the intermediate apex 52. The position Pmg is also referred to as outer end corresponding position of the intermediate apex 52.

A position indicated by reference character PB2 is a position on the outer surface of the second ply body 38a. The position PB2 is the position away from the outer end corresponding position Pmg of the intermediate apex 52 toward the outer end 50g side of the strip apex 50 by 10 mm. In the present disclosure, the position PB2 is a second reference position. The length from the outer end corresponding position Pmg to the second reference position PB2 is measured along the interface between the second ply body 38a and the strip apex 50.

In FIG. 3, a solid line L1 is a normal line that is normal to the outer surface of the second ply body 38a. The normal line L1 is located in a zone (hereinafter, referred to as a first zone) between the first reference position PB1 and the inner end 52n of the intermediate apex 52. As shown in FIG. 3, components of the apex 32 that are located in the first zone are the apex body 48 and the strip apex 50.

In FIG. 3, a length indicated by reference character ts1 is the thickness of the strip apex 50 at the position of the normal line L1. A length indicated by reference character ta1 is the thickness of the apex body 48 at the position of the normal line L1. The thickness ts1 and the thickness ta1 are measured along the normal line L1.

In the first zone, the intermediate apex 52 is not included. Therefore, a thickness tm1 of the intermediate apex 52 in the first zone is 0 (zero) mm. Therefore, in the first zone, a stiffness index R1 of the apex 32 at each position in the second ply body 38a is represented by the following equation (1a).

$$R1 = Ha \times ta1 + Hs \times ts1 \quad (1a)$$

In FIG. 3, a solid line L2 is also a normal line that is normal to the outer surface of the second ply body 38a. The normal line L2 is located in a zone (hereinafter, referred to as a second zone) between the second reference position PB2 and the outer end 52g of the intermediate apex 52. As shown in FIG. 3, a component of the apex 32 that is located in the second zone is the strip apex 50.

In FIG. 3, a length indicated by reference character ts2 is the thickness of the strip apex 50 at the position of the normal line L2. The thickness ts2 is measured along the normal line L2.

In the second zone, the apex body 48 and the intermediate apex 52 are not included. Therefore, a thickness ta2 of the apex body 48 in the second zone is 0 (zero) mm, and a thickness tm2 of the intermediate apex 52 therein is also 0 (zero) mm. Therefore, in the second zone, a stiffness index R2 of the apex 32 at each position in the second ply body 38a is represented by the following equation (1b).

$$R2 = Hs \times ts2 \quad (1b)$$

In FIG. 3, a solid line L3 is also a normal line that is normal to the outer surface of the second ply body 38a. The normal line L3 is located in a zone (hereinafter, referred to as a third zone) between the inner end 52n of the intermediate apex 52 and the outer end 48g of the apex body 48. As shown in FIG. 3, components of the apex 32 that are located in the third zone are the apex body 48, the strip apex 50, and the intermediate apex 52.

In FIG. 3, a length indicated by reference character ts3 is the thickness of the strip apex 50 at the position of the normal line L3. A length indicated by reference character tm3 is the thickness of the intermediate apex 52 at the position of the normal line L3. A length indicated by reference character ta3 is the thickness of the apex body 48 at the position of the normal line L3. The thickness ts3, the thickness tm3, and the thickness ta3 are measured along the normal line L3.

In the third zone, all the components included in the apex 32 are included. Therefore, in the third zone, a stiffness index R3 of the apex 32 at each position in the second ply body 38a is represented by the following equation (1c).

$$R3 = Ha \times ta3 + Hs \times ts3 + Hm \times tm3 \quad (1c)$$

In FIG. 3, a solid line L4 is also a normal line that is normal to the outer surface of the second ply body 38a. The normal line L4 is located in a zone (hereinafter, referred to as a fourth zone) between the outer end 48g of the apex body 48 and the outer end 52g of the intermediate apex 52. As shown in FIG. 3, components of the apex 32 that are located in the fourth zone are the strip apex 50 and the intermediate apex 52.

In FIG. 3, a length indicated by reference character ts4 is the thickness of the strip apex 50 at the position of the normal line L4. A length indicated by reference character tm4 is the thickness of the intermediate apex 52 at the position of the normal line L4. The thickness ts4 and the thickness tm4 are measured along the normal line L4.

In the fourth zone, the apex body 48 is not included. Therefore, a thickness ta4 of the apex body 48 in the fourth zone is 0 (zero) mm. Therefore, in the fourth zone, a stiffness index R4 of the apex 32 at each position in the second ply body 38a is represented by the following equation (1d).

$$R4 = Hs \times ts4 + Hm \times tm4 \quad (1d)$$

In the tire 2, the stiffness index R of the apex 32 at an arbitrary position in the zone from the first reference position PB1 to the second reference position PB2 is obtained by using one of the above-described equations (1a) to (1d). In the tire 2, when the stiffness index R of the apex 32 at the first reference position PB1 is defined as a reference stiffness index Rb, the ratio (R/Rb) of the stiffness index R of the apex 32 to the reference stiffness index Rb at an arbitrary position in the zone from the first reference position PB1 to the second reference position PB2 is preferably not less than 100% and not greater than 110%. Accordingly, as for the stiffness of the apex 32 around the outer end 48g of the apex body 48, a portion having an excessively high stiffness or a portion having an excessively lower stiffness is inhibited from being formed. In the tire 2, concentration of strain around the outer end 48g of the apex body 48 is effectively suppressed.

The tire 2 has improved durability even though the strip apex 50 is used in order to reduce rolling resistance and improve steering stability.

The tire 2 can have required durability while maintaining good steering stability even when thin sidewalls are used for rolling resistance.

As described above, according to the present invention, the tire 2 that can achieve reduction of rolling resistance while reducing a decrease in durability to be small, is obtained.

EXAMPLES

Hereinafter, the present invention will be described in further detail by means of examples, etc., but the present invention is not limited to these examples.

Example 1

A pneumatic tire for a passenger car (tire designation=215/70R16) having the basic structure shown in FIG. 1 and having specifications shown in Table 1 below was obtained.

In Example 1, the hardness Ha of the apex body, the hardness Hs of the strip apex, the hardness Hm of the intermediate apex, and the length L of the apex body were set as shown in Table 1.

The length a of the intermediate apex was set to 20 mm, and the length b from the inner end of the intermediate apex to the outer end of the apex body was set to 10 mm.

The thickness of the sidewall at the maximum width position PW was set to 3.0 mm.

Comparative Example 1

A tire of Comparative Example 1 is a conventional tire. The thickness of the sidewall was 5.0 mm. The apex was composed of only an apex body. In Comparative Example 1, no strip apex and no intermediate apex were used. The hardness Ha of the apex body was 80.

Comparative Example 2

A tire of Comparative Example 2 was obtained in the same manner as Comparative Example 1, except that a thin sidewall was used as the sidewall.

Comparative Example 3

A tire of Comparative Example 3 was obtained in the same manner as Comparative Example 2, except that the length L of the apex body was set to 40 mm.

Comparative Example 4

A tire of Comparative Example 4 was obtained in the same manner as Comparative Example 2, except that a strip apex (hardness Hs=80) was added. The specifications of the strip apex were set so as to have the same configuration as in Example 1 except for the hardness.

Examples 2 to 7 and Comparative Examples 5 to 8

Tires of Examples 2 to 7 and Comparative Examples 5 to 8 were obtained in the same manner as Example 1, except that the hardness Hs, the hardness Hm, and the hardness Ha were set as shown in Tables 2 and 3 below.

[Tire Mass]

The mass of each tire was measured. The results are shown as indexes in Tables 1 to 3 below with the result of Comparative Example 1 being regarded as 100. The lower the value is, the lighter the tire is.

[Rolling Resistance]

Using a rolling resistance testing machine, a rolling resistance coefficient (RRC) was measured when a test tire ran on a drum at a speed of 80 km/h under the following conditions. The results are shown as indexes in Tables 1 to 3 below with the result of Comparative Example 3 being regarded as 100. The higher the value is, the lower the rolling resistance of the tire is.

Rim: 16×6.5 J
Internal pressure: 240 kPa
Vertical load: 4.82 kN

[Durability]

A test tire was fitted onto a rim (size=16×6.5 J) and inflated with air to adjust the internal pressure thereof to 375 kPa. The tire was mounted to a drum type tire testing machine. A vertical load of 14 kN was applied to the tire, and the tire was caused to run on a drum (radius=1.7 m) at a speed of 80 km/h. The running distance was measured until damage to the tire was observed. The results are shown as indexes in Tables 1 to 3 below. The higher the value is, the less likely damage occurs and the better the durability is.

TABLE 1

|  | Comparative Example 1 | Comparative Example 2 | Comparative Example 3 | Comparative Example 4 | Example 1 |
| --- | --- | --- | --- | --- | --- |
| SW thickness [mm] | 5.0 | 3.0 | 3.0 | 3.0 | 3.0 |
| L [mm] | 35 | 35 | 40 | 35 | 35 |
| Hs | — | — | — | 80 | 85 |
| Hm | — | — | — | — | 80 |
| Ha | 80 | 80 | 80 | 80 | 75 |
| Hs – Hm | — | — | — | — | 5 |
| Hm – Ha | — | — | — | — | 5 |
| Mass | 100 | 85 | 95 | 90 | 90 |
| RRC | 110 | 90 | 100 | 92 | 92 |
| Durability | 6.0 | 3.0 | 5.0 | 5.0 | 6.0 |

TABLE 2

|  | Comparative Example 5 | Comparative Example 6 | Example 2 | Example 3 | Example 4 |
| --- | --- | --- | --- | --- | --- |
| SW thickness [mm] | 3.0 | 3.0 | 3.0 | 3.0 | 3.0 |
| L [mm] | 35 | 35 | 35 | 35 | 35 |
| Hs | 80 | 80 | 80 | 80 | 85 |
| Hm | 70 | 80 | 70 | 75 | 82 |
| Ha | 70 | 70 | 60 | 70 | 79 |
| Hs – Hm | 10 | 0 | 10 | 5 | 3 |
| Hm – Ha | 0 | 10 | 10 | 5 | 3 |
| Mass | 90 | 90 | 90 | 90 | 90 |
| RRC | 92 | 92 | 92 | 92 | 92 |
| Durability | 5.0 | 5.0 | 5.5 | 6.0 | 6.0 |

TABLE 3

|  | Example 5 | Example 6 | Example 7 | Comparative Example 7 | Comparative Example 8 |
| --- | --- | --- | --- | --- | --- |
| SW thickness [mm] | 3.0 | 3.0 | 3.0 | 3.0 | 3.0 |
| L [mm] | 35 | 35 | 35 | 35 | 35 |
| Hs | 81 | 90 | 90 | 90 | 90 |
| Hm | 78 | 85 | 80 | 90 | 80 |
| Ha | 75 | 80 | 70 | 70 | 80 |
| Hs – Hm | 3 | 5 | 10 | 0 | 10 |
| Hm – Ha | 3 | 5 | 10 | 20 | 0 |
| Mass | 90 | 90 | 90 | 90 | 90 |
| RRC | 92 | 92 | 92 | 92 | 92 |
| Durability | 6.0 | 6.0 | 5.5 | 5.0 | 5.0 |

As shown in Tables 1 to 3, it is confirmed that, in each Example, reduction of rolling resistance is achieved while a decrease in durability is reduced to be small. From the evaluation results, advantages of the present invention are clear.

The above-described technology capable of achieving reduction of rolling resistance while reducing a decrease in durability to be small can also be applied to various tires.

What is claimed is:

1. A tire comprising:
a pair of beads; and
a carcass extending on and between a first bead and a second bead out of the pair of beads, wherein
each of the beads includes a core and an apex,
the carcass includes a carcass ply,
the carcass ply includes a ply body extending between the core of the first bead and the core of the second bead, and a pair of turned-up portions each connected to the ply body and turned up around the core from an inner side toward an outer side in an axial direction,
the apex includes an apex body located radially outward of the core, a strip apex located axially outward of the ply body, and an intermediate apex located axially outward of the strip apex,
the apex body is tapered outward,
an inner end of the strip apex is between the ply body and the apex body,
an inner end of the intermediate apex is between the strip apex and the apex body in the axial direction,
an outer end of the apex body is between the inner end and an outer end of the intermediate apex in a radial direction,
the intermediate apex is between the inner end and an outer end of the strip apex in the radial direction,
the intermediate apex is harder than the apex body, and the strip apex is harder than the intermediate apex,
wherein
a first reference position is a position, in the ply body, away from another position, in the ply body, corresponding to the outer end of the apex body, toward the inner end side of the strip apex by 15 mm,
a second reference position is a position, in the ply body, away from another position, in the ply body, corresponding to the outer end of the intermediate apex, toward the outer end side of the strip apex by 10 mm,
a stiffness of the apex at each position in the ply body is represented by a stiffness index R indicated by the following equation (1) using a hardness Ha of the apex body, a hardness Hs of the strip apex, a hardness Hm of the intermediate apex, and a thickness ta of the apex body, a thickness ts of the strip apex, and a thickness tm of the intermediate apex which are measured along a normal line normal to the ply body, $$R = Ha \times ta + Hs \times ts + Hm \times tm \quad (1),\text{ and}$$

when the stiffness index R of the apex at the first reference position is defined as a reference stiffness index Rb, a ratio of the stiffness index R of the apex to the reference stiffness index Rb at an arbitrary position in a zone from the first reference position to the second reference position is from 100% to 110%.

2. The tire according to claim 1, wherein a length from the inner end of the intermediate apex to the outer end of the apex body is from 5 mm to 15 mm.

3. The tire according to claim 1, wherein a difference (Hm−Ha) between the hardness Hm of the intermediate apex and the hardness Ha of the apex body is not greater than 5.

4. The tire according to claim 1, wherein a difference (Hs−Hm) between the hardness Hs of the strip apex and the hardness Hm of the intermediate apex is not greater than 5.

5. The tire according to claim 1, wherein the hardness Ha of the apex body is from 60 to 80.

6. The tire according to claim 1, wherein a length of the apex body is from 15 mm to 45 mm.

7. The tire according to claim 6, wherein a ratio of a maximum width of the apex body to the length of the apex body is from 0.2 to 0.7.

8. The tire according to claim 1, wherein the hardness Hm of the intermediate apex is from 70 to 90.

9. The tire according to claim 1, wherein the hardness Hs of the strip apex is from 80 to 100.

10. A tire comprising:

a pair of beads; and a carcass extending on and between a first bead and a second bead out of the pair of beads, wherein each of the beads includes a core and an apex, the carcass includes a carcass ply, the carcass ply includes a ply body extending between the core of the first bead and the core of the second bead, and a pair of turned-up portions each connected to the ply body and turned up around the core from an inner side toward an outer side in an axial direction, the apex includes an apex body located radially outward of the core, a strip apex located axially outward of the ply body, and an intermediate apex located axially outward of the strip apex, the apex body is tapered outward, an inner end of the strip apex is between the ply body and the apex body, an inner end of the intermediate apex is between the strip apex and the apex body in the axial direction, an outer end of the apex body is between the inner end and an outer end of the intermediate apex in a radial direction, the intermediate apex is between the inner end and an outer end of the strip apex in the radial direction, the intermediate apex is harder than the apex body, the strip apex is harder than the intermediate apex, and a length of the intermediate apex is from 15 mm to 25 mm, wherein a first reference position is a position, in the ply body, away from another position, in the ply body, corresponding to the outer end of the apex body, toward the inner end side of the strip apex by 15 mm, a second reference position is a position, in the ply body, away from another position, in the ply body, corresponding to the outer end of the intermediate apex, toward the outer end side of the strip apex by 10 mm, a stiffness of the apex at each position in the ply body is represented by a stiffness index R indicated by the following equation (1) using a hardness Ha of the apex body, a hardness Hs of the strip apex, a hardness Hm of the intermediate apex, and a thickness ta of the apex body, a thickness ts of the strip apex, and a thickness tm of the intermediate apex which are measured along a normal line normal to the ply body, $$R = Ha \times ta + Hs \times ts + Hm \times tm \quad (1), \text{ and}$$

when the stiffness index R of the apex at the first reference position is defined as a reference stiffness index Rb, a ratio of the stiffness index R of the apex to the reference stiffness index Rb at an arbitrary position in a zone from the first reference position to the second reference position is from 100% to 110%.

11. The tire according to claim 10, wherein a length from the inner end of the intermediate apex to the outer end of the apex body is from 5 mm to 15 mm.

12. The tire according to claim 10, wherein a difference (Hm−Ha) between the hardness Hm of the intermediate apex and the hardness Ha of the apex body is not greater than 5.

13. The tire according to claim 10, wherein a difference (Hs−Hm) between the hardness Hs of the strip apex and the hardness Hm of the intermediate apex is not greater than 5.

14. The tire according to claim 10, wherein the hardness Ha of the apex body is from 60 to 80.

15. The tire according to claim 10, wherein a length of the apex body is from 15 mm to 45 mm.

16. The tire according to claim 15, wherein a ratio of a maximum width of the apex body to the length of the apex body is from 0.2 to 0.7.

17. The tire according to claim 10, wherein the hardness Hm of the intermediate apex is from 70 to 90.

18. The tire according to claim 10, wherein the hardness Hs of the strip apex is from 80 to 100.

19. The tire according to claim 10, wherein a stiffness at the outer end of the apex body is lower than a stiffness at another portion of the apex body.

* * * * *